(No Model.) 2 Sheets—Sheet 1.

D. W. SPOONER.
BUILDER'S SCAFFOLDING.

No. 298,791. Patented May 20, 1884.

Witnesses:
Frank W. Lauderdale,
J. W. Lauderdale

Inventor:
Daniel W. Spooner
by his attorney
Chas. H. Stetson.

(No Model.) 2 Sheets—Sheet 2.
D. W. SPOONER.
BUILDER'S SCAFFOLDING.
No. 298,791. Patented May 20, 1884.
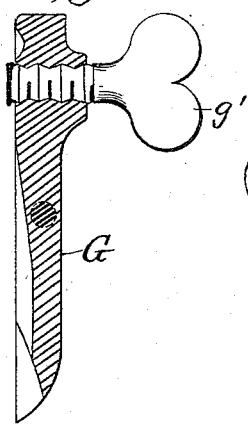
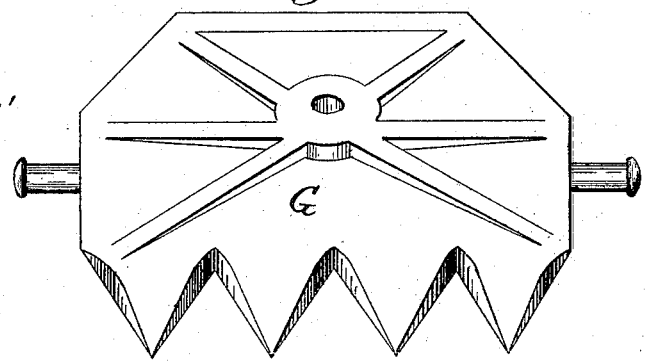
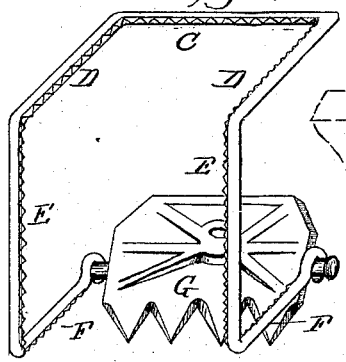
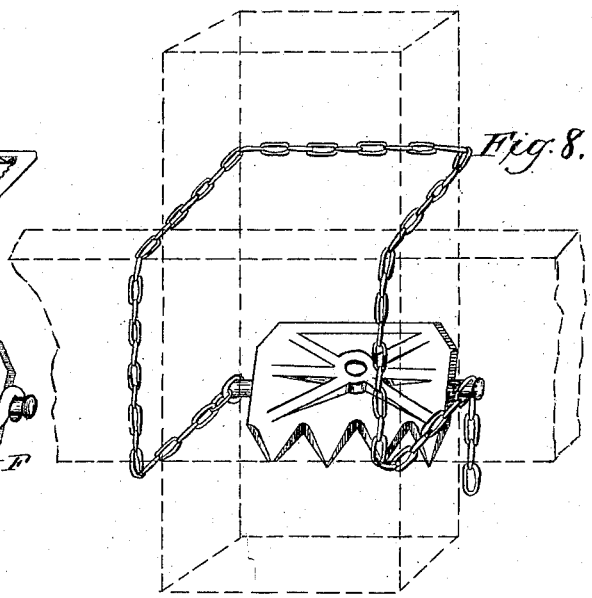
Witnesses:
J. N. Kalb
Chas. S. Kalb
Inventor,
Daniel W. Spooner
by his attorney
Chas. C. Stetson.
N. PETERS, Photo-Lithographer, Washington, D. C.

UNITED STATES PATENT OFFICE.

DANIEL W. SPOONER, OF MINNEAPOLIS, MINNESOTA.

BUILDER'S SCAFFOLDING.

SPECIFICATION forming part of Letters Patent No. 298,791, dated May 20, 1884.

Application filed August 23, 1883. (No model.)

*To all whom it may concern:*

Be it known that I, DANIEL W. SPOONER, a citizen of the United States, and a resident of Minneapolis, Hennepin county, Minnesota, have invented certain new and useful Improvements relating to Builders' Scaffolding, of which the following is a specification.

I employ the customary poles or upright joists at the usual intervals, and the ledger-boards or horizontal supports for the platforms, but secure them together in a peculiar manner and by improved means, which bind them firmly in position, and enable me to raise the scaffolding much quicker and without injury to the lumber by the use of nails, and also, where a high scaffolding is built, require much less material than formerly, as but two ledger-boards for the platforms need be in place at one time. I employ a rigid binding frame or clamp, preferably made of wire-rod iron provided with a strong engaging piece or dog, preferably of malleable iron, mounted in eyes therein, with liberty to swivel, notched on its lower edge, and having a sufficient thumb-screw in its upper part, the whole embracing the pole and ledger-board in such a manner that weight upon the latter will the more firmly engage the dog and hold the parts reliably in place. In erecting a scaffolding, I hold the ledger-board in position against the pole, and place the frame around the pole so as to bear evenly and firmly against its front face and against the rear face of the ledger-board, the lower extensions passing immediately under the edge of the ledger-board and forward, so that the eyes in the end thereof project slightly beyond the line of the front face of the pole. I then insert the dog or engaging-piece in the eyes by slightly springing them apart, and turn the thumb-screw until the dog is tilted sufficiently to engage the teeth or notches in the lower edge with the pole.

The accompanying drawings form a part of this specification, and represent what I consider the best means of carrying out my invention. A representation of a whole scaffold seeming unnecessary, I have shown in each instance but one pole and the connected parts.

Figure 1:
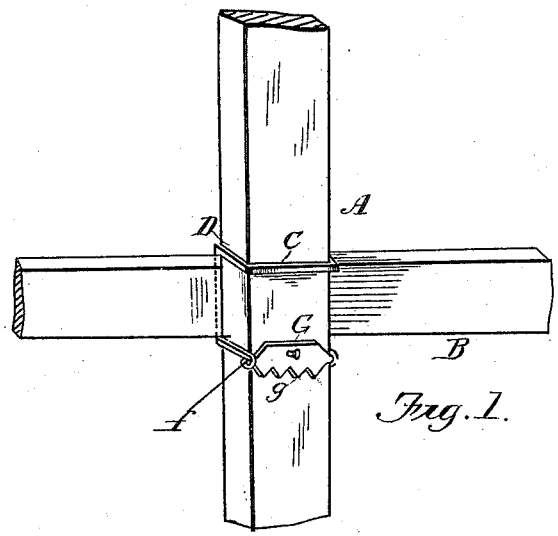
Figure 3:
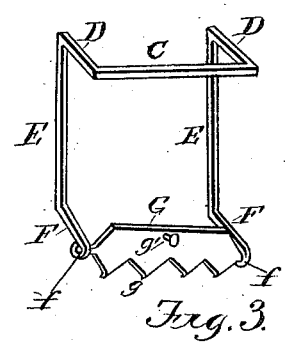
Figure 2:
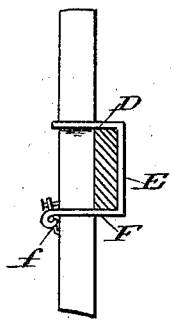
Figure 4:
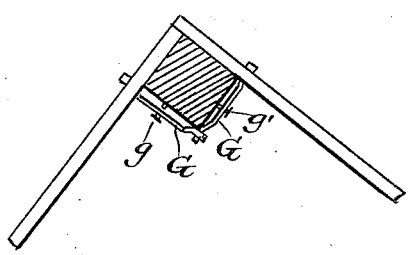

Figure 1 is a perspective view of two timbers, with improved device uniting them. Fig. 2 is an end view showing one of timbers in section. Fig. 3 is a perspective view of the device detached. Fig. 4 shows the device applied to the angle of the scaffolding, as at the corner of a house. Fig. 5 is an enlarged sectional view of the dog; Fig. 6, a front face view of the same. Fig. 7 is a perspective view of the binder-clamp and dog, the clamp being serrated on its inner edges; and Fig. 8 shows a flexible clamp as a chain, which will be adjustable to different-sized timbers.

Similar letters of reference indicate corresponding parts in all the figures.

A is the rectangular pole, usually a joist, and B the ledger-board, held together and supported by the clamp or binding-frame, of which C is the part bearing against the wide front face of the pole; D D, the backward continuation thereof; E E, the downward extensions, lying against the wide back face of the ledger-board, and F F the further horizontal extensions, projecting forward under, and which take the load of the ledger-board and platform thereon. The ends of the parts F F, projecting forward of the face of the post A, are bent around, forming eyes $f f$, which receive the pivot-ends of the engaging dog or piece G. The said dog is formed, as shown, with teeth $g$ in its lower edge, the bevel sides of which are undercut, so as to allow of a firm and strong engagement of the points with the wood, and at the same time present a broad surface, so that the timber is not deeply cut and injured.

In the upper edge of the part G, I place a thumb-screw, $g'$, as shown, the inner end of which is smooth, so as to avoid cutting into the wood, and is also slightly enlarged, so as to prevent a careless workman from entirely unscrewing it and losing it, and the corresponding surface of the dog G is preferably undercut or countersunk, to avoid any projection of the screw on the inner surface. In my construction all the parts take a share of the load, but particularly the parts F F $f f$ G, which are so proportioned and placed as to bear it with safety and ease. A few light diagonal stays, slightly tacked at intervals from one pole to another and to the window-sills or sides of the house, render the scaffolding sufficiently braced and firm.

My invention is adapted to staging for inside decoration or plastering, as it allows of varying the height of the platform without taking down and repiling, and is particularly useful where an increased height of a few feet has to be reached—as a raised place in the ceiling—the operator having merely to loosen the thumb-screws of the several clamps, lift the platform to the height desired, and again secure.

For corners of scaffolding I can, if preferred, provide clamps a little longer than usual, so as to overlap the other; but this will not in most cases be necessary.

It will be obvious that my binding-clamp may be reversed in position, the dog G uppermost, or in the place occupied in the drawings by the part C, in which situation it will serve well.

I propose to coat the clamp and dog with tar or other waterproofing, as protection against the weather.

Modifications may be made without departing from the principles or sacrificing the advantages of the invention.

I can, if desired, use a chain of sufficient strength for the parts C D E F in place of the rigid iron, in which case I would fasten one end of the engaging-dog G to an end link, leaving the other free to be placed in the eye of any link near the other end. By this means one size of fixture will do for various situations, in holding a single ledger-board, a lap, or an end, or where the pole may be thicker than usual, or irregular.

Instead of the screw $g'$, I can use a cam-lever fastener to the dog G, which, when pressed forward, will bear against the pole and cause the other edge of the dog to engage in the same.

I claim as my invention—

1. In combination with a pole and ledger-board of a scaffold, the clamp described, supporting the latter and completely embracing and binding both together against vertical, lateral, and torsional movement, and held firmly in place at any desired point of vertical adjustment by means of the movable dog which engages with said pole, as herein specified.

2. The scaffold-binding frame described, having the parts C D E F, with the engaging-dog pivoted in the eyes $ff$ thereof, substantially as and for the purposes specified.

3. The dog G $g$ $g'$, in combination with the parts C D E F $f$, adapted to serve substantially as herein described.

In testimony whereof I have hereunto set my hand, at Minneapolis, Minnesota, this 26th day of June, 1883, in the presence of the subscribing witnesses.

DANIEL W. SPOONER.

Witnesses:
 CHARLES C. STETSON,
 CARRIE A. SPOONER,
 E. C. KIDD.